Nov. 7, 1967 J. A. MARTIN ET AL 3,351,861

DUAL TIME CONSTANT AVC CIRCUIT

Filed June 8, 1964

INVENTORS
JERRY A. MARTIN
HOWARD B. ROOKS
BY
Moody and Phillion
ATTORNEYS 3,351,861

DUAL TIME CONSTANT AVC CIRCUIT

Jerry A. Martin, Cedar Rapids, and Howard B. Rooks, Marion, Iowa, assignors to Collins Radio Company, Cedar Rapids, Iowa, a corporation of Iowa Filed June 8, 1964, Ser. No. 373,424
5 Claims. (Cl. 325—410)

ABSTRACT OF THE DISCLOSURE

In an AVC circuit having a time constant circuit, a maximum voltage threshold circuit connected in parallel therewith for shunting therearound AVC signals exceeding a predetermined level, and comprising a series combination of a conventional diode with its low impedance presented to the AVC signal, and means for blocking signals below said predetermined level, such as a Zener diode, having its high impedance presented to the AVC voltage.

This invention relates generally to automatic volume control (AVC) time constant circuits and, more particularly, to an AVC time constant circuit which functions to effectively short circuit the delaying time constant when unusually strong signals are received.

In prior art AVC circuits, the reception of an unusually strong input signal usually results in a charging of the AVC time constant circuit to an excessively high value, thereby reducing the gain of the circuit too much with a resulting "bounce" in the output signal. Such an effect is especially marked in transistorized receivers using an AVC amplifier.

An object of the present invention is to provide an AVC circuit which will shunt excessively high signals around the time constant portion of the AVC circuit.

A second object of the invention is an AVC circuit in which "bounce" is avoided when an unusually large input signal is received.

A third purpose of the invention is the improvement of AVC circuits generally.

In accordance with the invention, there is provided in combination with an AVC circuit comprising a time constant, circuit means for producing a substantially D-C signal representative of the intensity of the received signal, a maximum voltage threshold device which is connected in parallel with the said time constant circuit means and which is constructed to shunt input signals, exceeding a predetermined level, around said time constant circuit.

In accordance with a feature of the invention, the maximum voltage threshold device comprises the series combination of a Zener diode and a conventional diode, with the reverse impedance of the Zener diode being presented to the detector stage which ordinarily precedes the AVC stage and with the forward or low impedance of the conventional diode being presented to said detector stage.

In accordance with another feature of the invention, the said maximum voltage threshold device comprises the series combination of a conventional diode and a battery source with the low forward impedance of the conventional diode being presented to the detector stage preceding the AVC stage and the battery polarity being arranged so that the high reverse impedance of said conventional diode is presented thereto.

The above-mentioned and other objects and features of the invention will be more fully understood from the following detailed description thereof when read in conjunction with the drawings, in which.

Figure 1:
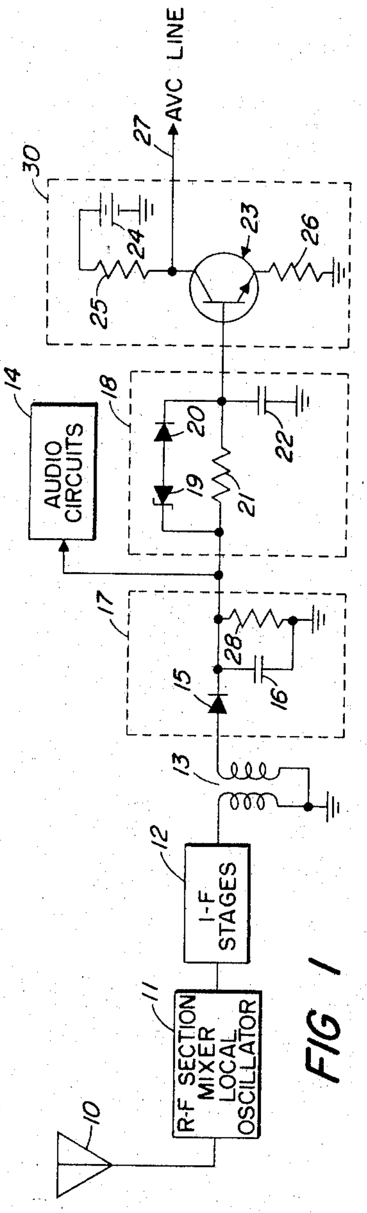
FIG. 1 is a schematic diagram of one embodiment of the invention.

Referring now to FIG. 1, the received signal is intercepted by antenna 10 and supplied to an R-F section 11, also including a mixer and a local oscillator. The output of the mixer (block 11) is supplied to the I-F stages 12. Transformer 13 represents the last transformer of the I-F stage, the secondary of which is connected to a detector 17.

Said detector 17 can be conventional and is shown as being comprised of a diode 15 and a filter arrangement consisting of capacitor 16 and resistor 28 connected to ground. The output of said detector 17 is supplied to conventional audio circuits 14 and is also supplied to an AVC circuit consisting of a time constant circuit 18 and an amplifier circuit 30.

The time constant circuit of the AVC system consists of resistor 21 and capacitor 22. Shunted across the resistor 21 is a circuit consisting of a series arrangement of Zener diode 19 and conventional diode 20, which circuit comprises the essence of the present invention. In the absence of the shunting circuit, the capacitor 22 would, in the presence of an unusually strong signal, charge to a high value, thus producing excessive gain in amplifier 30 so that the AVC output appearing on output line 27 would overcontrol the circuit and cause a "bounce" in reception.

The presence of the Zener diode 19 and the conventional diode 20, however, functions to provide a shunt path around the resistor 21, and thus around the entire time constant circuit, when a signal exceeding a predetermined strength is received. As is well known in the art, the reverse impedance of a Zener diode, such as Zener diode 19, has the characteristic of breaking down when the voltage applied thereacross exceeds a predetermined value. Different Zener diodes have different breakdown voltages and a particular type Zener diode having particular breakdown voltage characteristics can be selected to meet particular design requirements.

In the operation of the circuit of FIG. 1 a large signal raises the detector voltage to an abnormal level, and the Zener diode conducts to rapidly charge capacitor 22 since no appreciable time constants are involved. Thus, the gain of the receiver is reduced almost instantaneously and the Zener diode becomes nonconductive so that the AVC resumes normal performance.

The diode 20 is provided to prevent Zener diode 19 from clipping the normal modulation waveform due to normal diode action of Zener diode 19 in its forward direction.

Amplifier 30 consists of a transistor 23 having its collector voltage supplied from battery source 24 through resistor 25 and having its emitter connected to ground through resistor 26.

Figure 2:
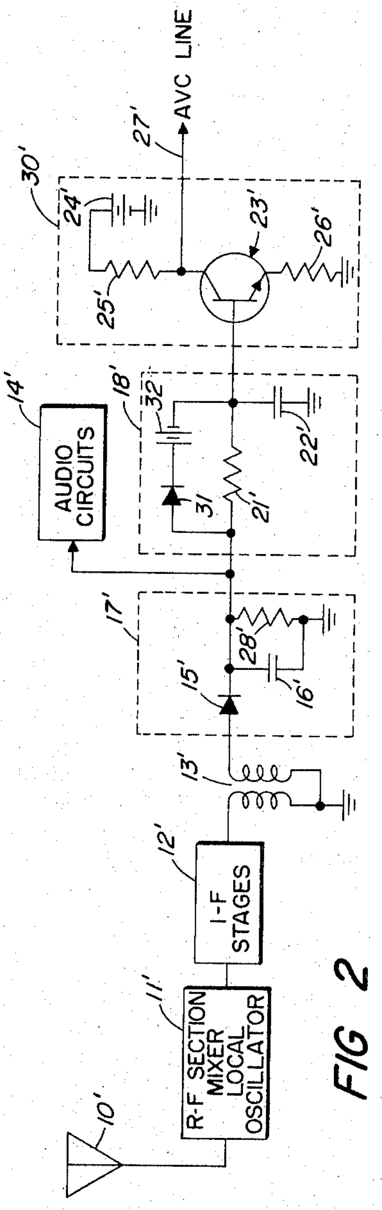
FIG. 2 is a schematic diagram of a second embodiment of the invention.

Referring now to the structure of FIG. 2, there is shown an alternative form of the invention, in which components and blocks which correspond to components and blocks of the structure of FIG. 1, are designated by the same reference characters, although primed.

The structure of FIG. 2 is different from that of FIG. 1 in that the shunt circuit around the time constant resistor 21' consists of a conventional diode 31 and a battery source 32 rather than a conventional diode and a Zener diode. Said diode 31 is connected in such a manner that its low impedance is presented to the detector stage 17' which normally precedes the AVC stage 18'. The polarity of the battery 32 is arranged such that the high impedance of the diode 31 is presented thereto.

In the operation of the structure of FIG. 2 the diode 31 will not conduct until the signal across resistor 21' exceeds the potential of battery 32. At such time, the diode 31 will begin to conduct and will effectively form a short circuit around resistor 21', thus providing a very rapid charging of capacitor 22' with a corresponding rapid decrease in gain of the over-all receiver.

It is to be noted that the forms of the invention shown and described herein are but preferred embodiments thereof and that various changes may be made in circuit design and arrangement without departing from the spirit or the scope of the invention.

We claim:

1. In an automatic volume control circuit comprising:
time constant circuit means for producing a substantially D-C output signal representative of the intensity of the received signal; and
maximum voltage threshold means connected in parallel with said time constant circuit means and constructed to shunt input signals above a predetermined threshold voltage level around said time constant circuit means;
said maximum voltage threshold means comprising the series combination of a Zener diode means and a conventional diode means;
said Zener diode means connected to present its high reverse impedance to the signal supplied to said time constant circuit means;
and said conventional diode means connected to present its low forward impedance to said supplied signal.

2. An automatic volume control circuit in accordance with claim 1 comprising:
detector circuit means constructed to supply a signal to said time constant circuit means,
said time constant circuit means comprising resistive means and capacitive means connected across the output terminals of said detector circuit means;
and means for extracting the D-C output signal of said time constant circuit means from the electrical point between said resistive means and said capacitive means;
said maximum voltage threshold means being connected across said resistive means.

3. In an automatic volume control circuit comprising:
time constant circuit means comprising resistive means and capacitive means for producing a substantially D-C output signal representative of the intensity of the received signal; and maximum voltage threshold means connected in parallel with said resistive means and constructed to shunt input signals above a predetermined threshold voltage level around said resistive means;
said maximum voltage threshold means comprising the series combination of a Zener diode means and a conventional diode means;
said Zener diode means connected to present its high reverse impedance to the signal supplied to said time constant circuit means;
and said conventional diode means connected to present its low forward impedance to said supplied signal.

4. In an automatic volume control circuit comprising:
time constant circuit means for producing a substantially D-C output signal representative of the intensity of the received signal;
maximum voltage threshold means connected in parallel with said time constant circuit means and constructed to shunt input signals above a predetermined threshold voltage level around said time constant circuit means;
said maximum voltage threshold means comprising conventional diode means having its low forward impedance presented to signal supplied to said time constant circuit means and, in series therewith, signal blocking means constructed to prevent current flow through the low forward impedance of said conventional diode means for voltage levels existing across said time constant circuit means below a predetermined value.

5. An automatic volume control circuit in accordance with claim 4 in which said signal blocking means comprises a Zener diode connected to present its high reverse impedance to said signal supplied to said time constant circuit means.

References Cited

UNITED STATES PATENTS 3,323,066 5/1967 Kurtz ---------------- 325—403

KATHLEEN H. CLAFFY, *Primary Examiner.*

R. LINN, *Assistant Examiner.*